United States Patent
Rösch et al.

(10) Patent No.: US 8,662,744 B2
(45) Date of Patent: Mar. 4, 2014

(54) METHOD OF CALIBRATING A POSITION SENSOR IN AN AUTOMOTIVE TRANSMISSION

(75) Inventors: Wolfgang Rösch, Bielefeld (DE); Thomas Ullrich, Bielefeld (DE)

(73) Assignee: Rollax GmbH & Co. KG, Bad Salzuflen (DE)

( * ) Notice: Subject to any disclaimer, the term of this patent is extended or adjusted under 35 U.S.C. 154(b) by 373 days.

(21) Appl. No.: 13/003,656

(22) PCT Filed: Jul. 15, 2009

(86) PCT No.: PCT/EP2009/005146
§ 371 (c)(1),
(2), (4) Date: Jan. 11, 2011

(87) PCT Pub. No.: WO2010/006781
PCT Pub. Date: Jan. 21, 2010

(65) Prior Publication Data
US 2011/0110392 A1 May 12, 2011

(30) Foreign Application Priority Data
Jul. 16, 2008 (DE) .................... 20 2008 009 558 U

(51) Int. Cl.
*G01M 17/00* (2006.01)
*G01R 35/00* (2006.01)
*G01D 21/00* (2006.01)
*G01K 1/14* (2006.01)

(52) U.S. Cl.
USPC ............... 374/1; 374/141; 374/143; 374/208; 73/866.5; 701/33.1; 324/601

(58) Field of Classification Search
USPC ......... 374/208, 141, 143, 100, 1, 198, 43, 45; 701/68, 31.1, 29.7, 29.8, 30.3, 30.5, 701/30.7, 30.8, 51, 62, 29.2; 116/209, 216, 116/28.1, 39, 101, 102; 477/8, 13, 34, 97, 477/166, 174, 70; 73/115.02; 324/207.11, 324/207.12, 207.13
See application file for complete search history.

(56) References Cited

U.S. PATENT DOCUMENTS 5,883,306 A * 3/1999 Hwang .................... 73/146.8
6,865,467 B2 * 3/2005 Berger et al. ................ 701/51
(Continued)

FOREIGN PATENT DOCUMENTS

DE 2646393 A1 4/1978
DE 3443176 C1 12/1985
(Continued)

OTHER PUBLICATIONS

Hirt, Gunter—Schaeffler KG—Sensor Detent Pin as new cost optimized solution for Neutral Gear Detection in Manual Transmissions, 7th Annual CTI Symposium, Dec. 1-4, 2008, 14 pages.
(Continued)

*Primary Examiner* — Gail Verbitsky
(74) *Attorney, Agent, or Firm* — Richard M. Goldberg

(57) ABSTRACT

A method of calibrating a position sensor in an automotive transmission having a transmission housing having mounted therein a casing (10) for the position sensor which includes a pressure member (14) movably supported in the casing (10), and an electrical displacement sensor (38) actuated by the pressure member (14) for measuring the position of the pressure member (14) relative to the casing (10), such that, after the casing (10) of the position sensor has been mounted in the transmission housing, the displacement sensor (38) is used for performing at least one calibration measurement for at least one gear position, and, for each gear position to be detected, a tolerance range for the corresponding measurement value of the displacement sensor is defined on the basis of the result of the calibration measurement.

9 Claims, 3 Drawing Sheets

(56) References Cited

U.S. PATENT DOCUMENTS

| | | | |
|---|---|---|---|
| 8,116,956 B2* | 2/2012 | Connolly et al. | 701/67 |
| 8,135,523 B2* | 3/2012 | Panzer | 701/68 |
| 8,335,634 B2* | 12/2012 | Kang et al. | 701/110 |
| 2003/0114975 A1* | 6/2003 | Berger et al. | 701/55 |
| 2005/0239595 A1* | 10/2005 | Surampudi | 477/70 |
| 2009/0090161 A1* | 4/2009 | Amino | 72/453.12 |
| 2009/0292432 A1* | 11/2009 | Suzuki et al. | 701/68 |
| 2010/0152986 A1* | 6/2010 | Priller et al. | 701/68 |

FOREIGN PATENT DOCUMENTS

| | | |
|---|---|---|
| DE | 4307596 C2 | 9/1994 |
| DE | 19509878 C1 | 1/1997 |
| DE | 19654004 A1 | 6/1998 |
| DE | 19938110 A1 | 2/2001 |
| DE | 102005034864 A1 | 2/2007 |
| DE | 102005034865 A1 | 2/2007 |
| WO | 2009077326 A1 | 6/2009 |

OTHER PUBLICATIONS

Hirt, Gunter—Schaeffler KG—Integrated hydraulic Shift Fork Actuator for Countershaft Transmissions, 7th Annual CTI Symposium, Dec. 1-4, 2008, 34 pages.

* cited by examiner

METHOD OF CALIBRATING A POSITION SENSOR IN AN AUTOMOTIVE TRANSMISSION

BACKGROUND OF THE INVENTION

The invention relates to a method of calibrating a position sensor in an automotive transmission.

DE 43 07 596 C2 discloses a detent device for a transmission, comprising a pressure member that is movably supported in a casing and elastically biased into a position in which it projects from the casing, and an electric signal generator actuated by the pressure member. The detent device serves for arresting a selector shaft of the transmission in the respectively selected position. The pressure member is elastically biased against a selector relief formed on the selector shaft and is capable of engaging in different depressions in the selector relief that are respectively associated with predetermined shift positions. Integrated in the casing is, as signal generator, a switch that serves as reversing light switch and is closed whenever the pressure member is engaged in the detent depression for the reverse gear.

DE 195 09 878 C1 discloses a similar detent device that additionally comprises a tolerance compensating mechanism that permits to automatically compensate tolerances in the shape of the selector relief and the mounting position of the casing of the detent device.

If, as has been described in DE 10 2005 034 864, the signal generator is a displacement sensor for measuring the position of the pressure member relative to the casing, then it is possible, in principle, to quantitatively measure different depths of the depressions in the selector relief in which the pressure member is respectively engaged, so as to detect the actual shift position of the transmission on the basis of different depths of the detent depressions. In this way, it is not only possible to detect a specific shift position, e.g. the reverse gear position, but it is possible to distinguish between a plurality of different shift positions of the transmission by quantitatively evaluating the signal of the signal generator. This results in a position sensor capable of detecting different shift positions of the transmission, e.g., the neutral position of the transmission in addition to the reverse gear position.

SUMMARY OF THE INVENTION

It is an object of the invention to provide a method for simply and exactly calibrating such a position sensor.

According to the invention, in order to achieve this object, the displacement sensor is used for performing at least one calibration measurement for at least one shift position of the transmission after the casing of the position sensor has been mounted in the transmission housing, and, for each shift position to be detected, a tolerance range for the corresponding measurement result of the displacement sensor is defined on the basis of the result of this calibration measurement.

In a sensor that is calibrated in accordance with this method, the decision, to which shift position the transmission has actually been set, is the task of a specific evaluation electronics which does not necessarily form part of the sensor. The sensor delivers only the result of the displacement measurement to this evaluation electronics, and when this result is within the tolerance range that has been defined during calibration, the evaluation electronics decides that the transmission is in the position that is associated with this tolerance range. Since the calibration measurement is performed only after the casing of the position sensor has been mounted in the transmission housing, the calibration can eliminate all tolerances that may influence the result of the displacement measurement.

Useful details of the invention are indicated in the dependent claims.

According to an advantageous further development of the invention, a re-calibration is performed continuously or at least from time to time during the period in which the transmission is in use. When ageing or wear effects result in a time drift of the displacements of the pressure member measured for the different shift transmission, this can be detected by comparing the measurement results that have been obtained in the time succession, and the tolerance ranges can be re-adjusted accordingly. When it turns out that the tolerance ranges for two different shift positions of the transmission approach one another or are about to overlap, an alarm signal may be issued so that a repair of the involved component parts of the transmission can be initiated.

The method according to the invention is particularly useful for vehicles having an automatic start/stop function, wherein it is necessary to detect also whether the transmission is in a drive position or in the neutral position. Likewise, the invention permits also to detect other shift positions, e.g. the position for the first speed, the second speed, etc., so that the driver may be given a feedback on the respectively selected gear position. Further, the position sensor may of course serve as reversing light switch, as before.

Since the calibration method permits to practically eliminate all tolerances, the differences in the levels of the selector relief for different gear positions may be selected very small. This has the advantage that the force with which the pressure member is biased against the selector relief is almost equal for the different gear positions, so that the driver feels essentially the same detent force, irrespective of which position has been selected.

BRIEF DESCRIPTION OF THE DRAWINGS

Embodiment examples will now be described in conjunction with the drawings, wherein.

DETAILED DESCRIPTION

Figure 1:
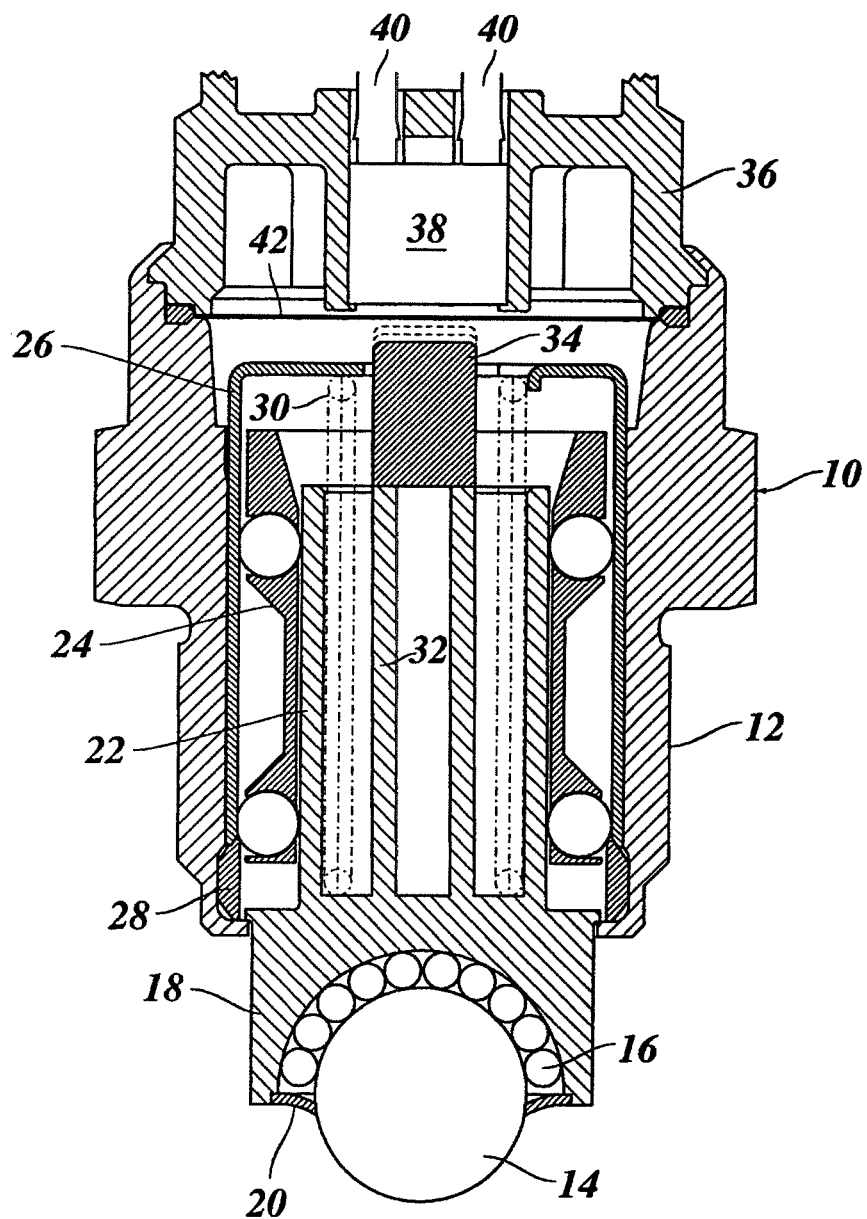
FIG. 1 is an axial section of a detent device which forms also a position sensor for an automotive transmission.

A detent device shown in FIG. 1 comprises a casing 10 in the form of a so-called arresting screw having an external thread 12 with which it can be screwed into a housing of a shift transmission which has not been shown here. At the end of the casing 10 that projects into the transmission housing, there is arranged a pressure member 14 in the form of a detent ball that is supported with low friction by means of bearing balls 16 in a bearing cup 18 and is secured by means of a holding ring 20. The bearing cup 18 forms the end of a cylindrical sleeve 22 that is supported in a ball bearing 24 and is axially movable within a limited range in the casing 10. An outer race for the balls of the ball bearing 24 is formed by a cup 26 pressed into the casing and made of deep-drawn and hardened sheet metal and being secured at its lower end by a conical ring 28, the top end of the cup being closed except for a central opening and forming a counter-bearing for a spring 30. The spring 30 extends axially in the sleeve 22 and has its lower end supported on the bearing cup 18. The spring 30 surrounds an inner tube 32 formed coaxially inside the sleeve 22 and carrying, on its upper end, a magnet 34 (permanent magnet) that projects upwardly from the opening of the cup 26.

A plastic cap 36, only part of which has been shown in the drawing, is inserted in the top end of the casing 10 and accommodates a magnetic displacement sensor 38, e.g. a hall sensor, such that it is opposed to the top end of the magnet 34 with a spacing therebetween. Electrical contacts 40 of the displacement sensor 38 are passed upwardly to the outside of the cap 36.

The displacement sensor 38 senses the magnetic field of the magnet 34 and is capable of measuring the distance between the magnet 34 and the sensor 38 with high precision, e.g., a precision of only a few μm. Thus, a multi-valued, e.g. analogue electric signal can be picked-up at the contacts 40, said signal indicating precisely the axial position of the magnet 34. In FIG. 1, several possible positions of the magnet 34 have been indicated in dashed lines. The analogue signal of the displacement sensor 38 may optionally be evaluated in an analogue electronic circuit or may first be digitized and then evaluated further in a digital electronic circuit.

Thus, in the example shown, the displacement sensor 38 is a contactless sensor, which has the advantage that problems of wear and contamination are avoided. Moreover, it is possible to separate the mechanical part of the detent device from the displacement sensor by means of a thin separating wall or membrane 42 of non-magnetic material, thereby to safely encapsulate the mechanical part of the detent device and, at the same time, to protect the displacement sensor 38 against contamination.

In place of a hall sensor, other contactless sensors, e.g. an inductive sensor or a capacitive sensor, may be used as displacement sensor 38. In such cases, the magnet 34 could be replaced by an electrically conductive body.

Figure 2:
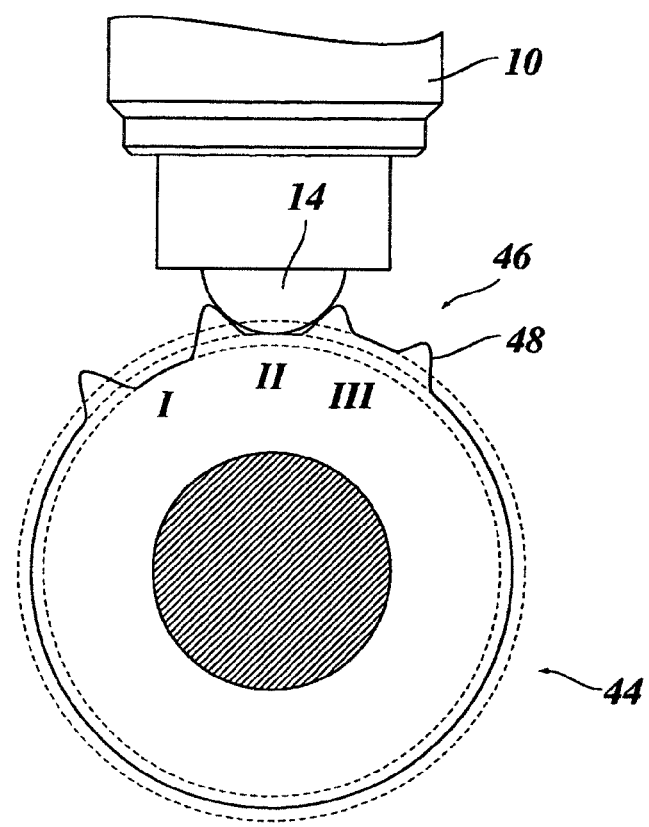
FIG. 2 is a partial view of the detent device in conjunction with a selector shaft shown in cross-section.

FIG. 2 shows the lower part of the casing 10 and the pressure member 14 in conjunction with a selector shaft 44 of a vehicle shift transmission. The selector shaft 44 carries a selector relief 46 having three depressions formed in different circumferential areas and designated here as I, II and III and separated from one another by hills 48 of the selector relief. Dependent upon the shift position of the transmission, the pressure member 14 engages in one of the depressions, in the depression II in the example shown.

Although not shown in the drawing, the depressions I, II, III (and possible further depressions which have not been shown) may be configured such that the pressure member 14 provides a detent not only in rotational direction of the selector shaft 44 but also in axial direction thereof.

The depressions, I, II and III differ from one another in their depths. In FIG. 2, the radii of the bottoms of the respective depressions have been shown in dashed lines. Thus, each shift position of the transmission corresponds to a depression with a different depth and, accordingly, another axial position of the pressure member 14 and, consequently, a different distance between the magnet 34 and the displacement sensor 38 in FIG. 1. In the example shown, the depression I may correspond to the reverse gear, the depression II to the neutral position of the transmission and the depression III may correspond to the other positions of the transmission. Optionally, it is possible to differentiate between the different forward gear positions by means of a correspondingly larger number of depressions which may be arranged in circumferential direction or else in axial direction of the selector shaft.

Figure 3:
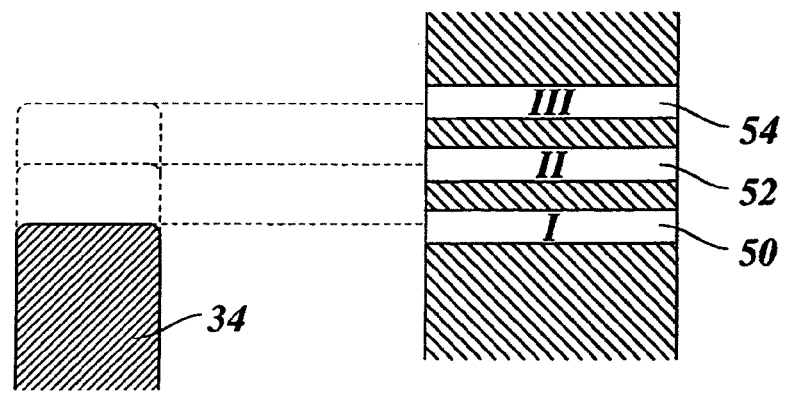
FIG. 3 is a diagram for explaining the evaluation of the signal of a displacement sensor in the detent device.

FIG. 3 illustrates schematically how the signal of the displacement sensor 38, indicating the position of the magnet 34, may be evaluated electronically in order to recognize the respective condition of the shift transmission. In FIG. 3, the magnet 34 has been shown in continuous lines in its lowermost position corresponding to the depression I. The positions corresponding to the other depressions have been shown in dashed lines. Each of these positions corresponds with a certain value of the signal of the displacement sensor 38. When the value that is actually measured by the displacement sensor 38 differs by less than a certain tolerance amount from the position that should exactly correspond to the depression I, i.e. is within a tolerance range, designated as 50 in FIG. 1, the evaluation electronics recognizes that the pressure member 14 is engaged in the depression I (reverse gear). Correspondingly, the depression II or III is recognized when the measured value is in the tolerance range 52 or 54. However, the tolerance ranges are separated from one another by certain "forbidden zones" in which the measured signal cannot unambiguously be associated with a certain gear position. This permits a safe and robust detection of the actual condition of the transmission. If the measured value is not in one of the ranges 50, 52, 54, then the signal is determined to be non-evaluable, and if this state persists for a longer time, an error message can be delivered.

The positions of the tolerance ranges 50, 52 and 54 relative to one another are determined by the machining of the selector relief 46 and are therefore known with sufficient accuracy for a given lot of transmissions. The absolute positions of these ranges are also dependent on the mounting position of the casing 10 in the transmission housing and may therefore vary somewhat from transmission to transmission. However, these variations may be compensated for by performing, after the casing has been mounted, at least one measurement for one of the depressions I, II or III, and by calibrating the position of the tolerance ranges 50, 52, 54 accordingly.

Figure 4:
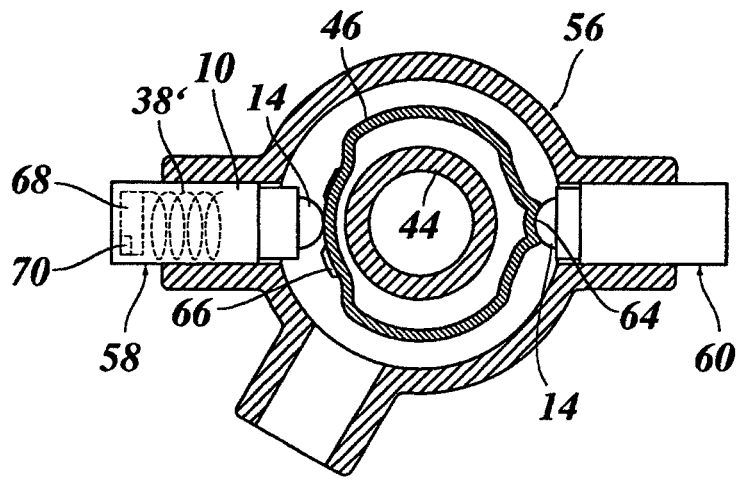
FIG. 4 is a cross-section of a transmission having a position sensor according to another embodiment.

While, in the example described above, the gear position sensor also serves as a detent device for mechanically arresting the selector shaft, it is also possible to separate the functions of the position measurement and the detent function. As an example, FIG. 4 shows a cross-section of a transmission housing 56 in which the selector shaft 44 is supported which in turn carries the selector relief 46. Here, the transmission housing 56 carries a position sensor 58 and a detent device 60 in two positions that are diametrically opposite to one another relative to the selector shaft 44. Each of the position sensor 58 and the detent device 60 have a pressure member 14 biased against the selector relief 46, and they may have an identical construction, with the exception that the detent device 60 does not need to have a displacement sensor.

On the side of the detent device 60, the selector relief 46 forms an axial guide grove 64 in which the pressure member 14 engages, so that the selector shaft 44 is arrested in its angular position whereas it is movable in axial direction (e.g. for selecting a shift lane).

When the selector shaft 44, in a given axial position, is rotated about its axis in order to select a certain gear, the pressure member 14 of the position sensor 58 gauges different plateaus 66 on the side of the selector relief 46 facing the position sensor, the plateaus being distinguished by their height and each associated with a certain gear position. The selected gear position is recognized by measuring the height of the respective plateau with a displacement sensor 38' in the position sensor 58.

The construction shown in FIG. 4, wherein the position sensor 58 and the detent device 60 are opposed to one another has the advantage that the elastic forces exerted by the pressure members 14 cancel each other, so that a better balance of the selector shaft 44 is obtained.

In this example, the displacement sensor 38' is an inductive sensor the signal of which is evaluated directly in an evaluation electronics 68 in the casing 10. The evaluation electronics includes also a temperature sensor 70 measuring the actual temperature of the transmission and the position sensor 58, and specifically, the temperature of the displacement sensor 38' is measured. The measured temperature can be used, on the one hand, for compensating thermal expansions of those component parts of the trans-mission and the sensor which would compromise the result of the displacement measurement and, on the other hand, may also be used for compensating a known temperature drift of the inductive displacement sensor 38' and possibly other components of the evaluation electronics 68. The temperature of the evaluation electronics 68 integrated in the casing of the position sensor 58 is measured as a temperature representative of the temperature of the position sensor 58 and the transmission housing 56. In general, this concept permits the use of displacement sensors which need to have only a low temperature stability.

When the transmission shown in FIG. 4 is mounted, the selector relief 46 is first mounted on the selector shaft 44, and subsequently the selector shaft is mounted in the transmission housing 56 and supported therein with bearings that have not been shown. Then, the casings of the position sensor 58 and the detent device 60 are mounted in the transmission housing 56 in their respective positions, e.g. by screwing or pressing them in. It is only at the end of the mounting line, when at least all component parts of the transmission that may influence the movement of the pressure member 14 in the position sensor 16 have been mounted, that this position sensor is calibrated. In this way, it is assured that the calibration eliminates all relevant tolerances, e.g. tolerances of the bearings for the selector shaft 44, tolerances in the mounting position of the selector relief 46 on the selector shaft, and tolerances in the mounting position of the position sensor 58 in the transmission housing 56.

Figure 5:
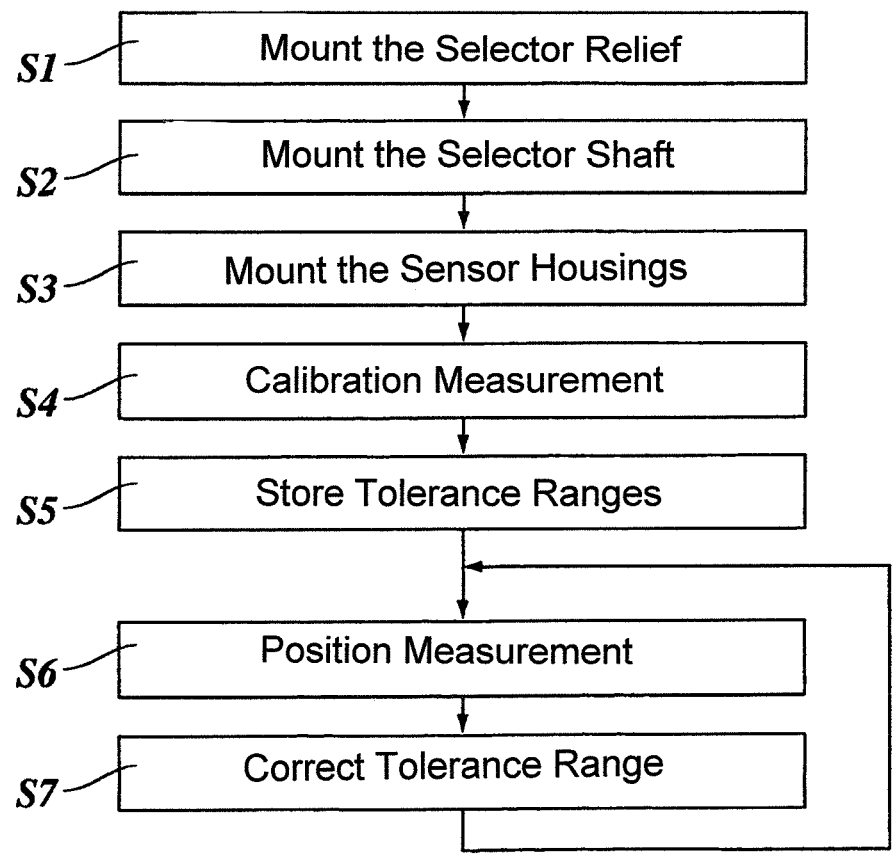
FIG. 5 is a flow diagram for the method according to the invention.

In FIG. 5, the different mounting and calibration steps have been indicated in a flow diagram. The sequence of the steps S1 to S3 is not compulsory. It is only important that the mounting steps are performed prior to the step S4 where the calibration measurements are performed. In these calibration measurements, the position of the pressure member relative to the casing 10 is preferably measured for each gear position, i.e. for each plateau 66 by means of the displacement sensor 38'. Conveniently, the selector shaft is repeatedly moved between the different gear positions, and several measurements are performed, so that the measurement results permit not only to determine the positions of the corresponding tolerance ranges but also to determine the width of the tolerance ranges on the basis of the variance of the measurement results (see FIG. 3).

During the time of use of the shift transmission, the pressure members 14 and the corresponding contours of the selector relief 46 may be subject to wear, so that the tolerance ranges associated with the individual gear positions may be offset. Corresponding offsets may also result from other effects, e.g. thermal expansion of the transmission housing 56 and the like. For this reason, in the method that is proposed here, after the calibration has been completed with storing the tolerance ranges in step S5, a continued recalibration is provided during the operating time of the transmission. In step S6, a position measurement is effected, wherein the position of the pressure member relative to the casing is determined. Then, the evaluation electronics compares the measurement result with the stored tolerance ranges and signals the detected gear position to a higher-level controller. Further, the evaluation electronics forms a floating average on the basis of the actual position measurement and one or more preceding position measurements for the same gear position, and on the basis of this floating average and, optionally, the measured variance of the measurement results, the tolerance range for this gear position is re-calculated in step S7. The same applies to the other gear positions. During the operation time of the transmission, the steps S6 and S7 are repeated cyclically, e.g. after each shift operation or after a certain number of shift operations or after a certain operating time.

What is claimed is:

1. A method of calibrating a position sensor in an automotive transmission having a transmission housing having mounted therein a casing for the position sensor which comprises a pressure member movably supported in the casing, and the position sensor actuated by the pressure member for measuring the position of the pressure member relative to the casing, wherein there is an initial determined position of the pressure member relative to the casing for each gear position after the casing of the position sensor has been mounted in the transmission housing, the method comprising the steps of:
   performing a calibration step comprising at least one measurement with the position sensor of a position of the pressure member relative to the casing for each gear position,
   defining a tolerance range for a value of each corresponding position measurement of the pressure member on the basis of the result of the position measurement, for each gear position to be detected, and
   storing the tolerance range for further position measurement and re-calibration.

2. The method according to claim 1, wherein said step of performing includes the step of performing at least one said position measurement for each gear position to be detected.

3. The method according to claim 1, further comprising the step of continually correcting the tolerance range on the basis of the results of current position measurements while the transmission is operating.

4. The method according to claim 1, further comprising the steps of:
   measuring the temperature of the transmission, and
   correcting the result of the position measurement for thermal expansions of component parts of at least one of the transmission and the position sensor in response to said step of measuring.

5. The method according to claim 1, further comprising the steps of:
   measuring the temperature of the position sensor, and
   correcting the result of the position measurement for a temperature drift of the position sensor.

6. The method according to claim 4, wherein said step of measuring the temperature comprises the step of measuring the temperature of an evaluation electronics integrated in the casing of the position sensor as a temperature representative of the temperature of the position sensor and the transmission housing.

7. The method according to claim 5, wherein an inductive sensor is used as the position sensor.

8. The method according to claim 5, wherein said step of measuring the temperature comprises the step of measuring the temperature of an evaluation electronics integrated in the casing of the position sensor as a temperature representative of the temperature of the position sensor and the transmission housing.

9. The method according to claim 6, wherein an inductive sensor is used as the position sensor.

\* \* \* \* \*